(12) United States Patent
Gertzmann et al.

(10) Patent No.: US 9,624,387 B2
(45) Date of Patent: Apr. 18, 2017

(54) AQUEOUS ACRYLIC COATING SYSTEM AND METHOD FOR IMPROVING THE APPEARANCE OF GRAINED WOOD SURFACES

(75) Inventors: Rolf Gertzmann, Leverkusen (DE); Pantea Nazaran, Köln (DE); Joan Miguel Garcia Martinez, Barcelona (ES); Maria Almato Guiteras, Barcelona (ES)

(73) Assignee: Covestro Deutschland AG, Leverkusen (DE)

(*) Notice: Subject to any disclaimer, the term of this patent is extended or adjusted under 35 U.S.C. 154(b) by 769 days.

(21) Appl. No.: 13/985,427

(22) PCT Filed: Feb. 14, 2012

(86) PCT No.: PCT/EP2012/052517
§ 371 (c)(1),
(2), (4) Date: Oct. 4, 2013

(87) PCT Pub. No.: WO2012/110515
PCT Pub. Date: Aug. 23, 2012

(65) Prior Publication Data
US 2014/0017449 A1    Jan. 16, 2014

(30) Foreign Application Priority Data
Feb. 17, 2011 (EP) .................................... 11154865

(51) Int. Cl.
*B44F 9/02* (2006.01)
*C09D 7/12* (2006.01)
*C09D 133/08* (2006.01)

(52) U.S. Cl.
CPC .............. *C09D 7/1216* (2013.01); *B44F 9/02* (2013.01); *C09D 133/08* (2013.01); *C08L 2201/50* (2013.01); *Y10T 428/24438* (2015.01)

(58) Field of Classification Search
CPC ....... C09D 7/1216; C09D 133/08; B44F 9/02; Y10T 428/24438; C08L 2201/50
USPC ................... 428/151; 524/406, 561
See application file for complete search history.

(56) References Cited

U.S. PATENT DOCUMENTS

| | | | |
|---|---|---|---|
| 2,754,223 A | 7/1956 | Caroselli | |
| 2,870,037 A | 1/1959 | Converse | |
| 5,162,415 A * | 11/1992 | Rehmer | C08K 5/132 524/359 |
| 2003/0236374 A1* | 12/2003 | Bardman | C08F 220/18 526/274 |
| 2004/0220326 A1 | 11/2004 | Gurtler et al. | |
| 2005/0014889 A1* | 1/2005 | Lach | C08F 220/12 524/556 |
| 2007/0060702 A1* | 3/2007 | Gao | C08F 2/22 524/700 |
| 2011/0017097 A1* | 1/2011 | Ruckebusch | C09D 5/004 106/286.3 |

FOREIGN PATENT DOCUMENTS

| | | |
|---|---|---|
| GB | 1363194 A | 8/1974 |
| WO | WO-00/39181 A1 | 7/2000 |

OTHER PUBLICATIONS

International Search Report for PCT/EP2012/052517 mailed Mar. 16, 2012.
International Preliminary Report on Patentability from corresponding International Application No. PCT/EP2012/052517 dated Aug. 21, 2013.

* cited by examiner

*Primary Examiner* — Nathan Van Sell
(74) *Attorney, Agent, or Firm* — Drinker Biddle & Reath LLP

(57) ABSTRACT

The invention is directed to a one-component (1K) coating system comprising an aqueous polyacrylate polymer dispersion and one or more compounds of elements of sub-groups 5 and/or 6 of the periodic table in which the particular element has an oxidation state of at least +4.

10 Claims, No Drawings

AQUEOUS ACRYLIC COATING SYSTEM AND METHOD FOR IMPROVING THE APPEARANCE OF GRAINED WOOD SURFACES

CROSS REFERENCE TO RELATED APPLICATIONS

This application is a national stage application (under 35 U.S.C. §371) of PCT/EP2012/052517, filed Feb. 14, 2012, which claims benefit of European application 11154865.7, filed Feb. 17, 2011 which are both incorporated by reference.

The present invention relates to an primary acrylic coating system comprising a polacrylate polymer which is useful for enhancing the appearance of grained wood surfaces. The invention also relates to a method for improving the appearance of grained wood surfaces, the use of a coating system according to the invention for the coating of grained wood surfaces and a grained wood surface comprising a coating obtained by applying a coating system according to the invention and subsequent drying of the coating system.

Aqueous coating compositions are increasingly being used instead of systems containing solvent with the objective of reducing emissions of organic solvents. Polyacrylate dispersions comprise one important class of aqueous lacquer binders which are known for relatively long time and are produced via radical polymerization of acrylic or vinylic monomers under the emulsion polymerization process.

Polyacrylate dispersions combine the important properties of resistance to water and chemicals and durability. It is thus advantageous to use polyacrylate dispersions for indoor and outdoor applications, especially for coating surfaces exposed to both mechanical stress and moisture.

The appearance of the grain of the wood is an important point of interest in clear wood varnishes. A high contrast within the wood is desirable for wood surfaces such as parquet flooring and furnitures.

The present invention therefore has the object of providing a coating system and a method for enhancing the grain appearance of wood in a simple manner without compromising other positive features of the coating system such as resistance to chemicals and water.

According to the invention this object is achieved by a one-component coating system comprising
an aqueous polyacrylate polymer dispersion and
one or more compounds of elements of sub-groups 5 and/or 6 of the periodic table in which the particular element has an oxidation state of at least +4,
whereby the polyacrylate polymer does not contain any urethane moieties and the coating system does not contain any curing agent selected from the group consisting of ketimine-based curing agents, aliphatic amine curing agents, aromatic amine curing agents, polyamide curing agents, thiol-based curing agents, isocyanates, isocyanates in blocked form, adducts of polyisocyanates, adducts of polyisocyanates in blocked form, and (co)polymers of isocyanate-functional monomers.

An urethane moiety denotes a divalent radical of structural formula —NH—C(=O)—O—.

It has surprisingly been found that the addition of the aforementioned compounds of elements of sub-groups 5 and/or 6 of the periodic table to aqueous dispersions containing polyacrylate polymers leads to a desired improvement in the contrast of the grain in the wood when compared to those aqueous dispersions lacking these compounds. Thus, existing polymer binders may be used, so that the need for additional development of formulations is reduced.

Amine curing agents are aliphatic amines and their adducts (e.g. Ancamine® 2021), phenalkamines, cycloaliphatic amines (e.g. Ancamine® 2196), amido amines (e.g. Ancamide® 2426), polyamides and their adducts, and mixtures of thereof.

Isocyanate curing agents are aliphatic, alicyclic, and aromatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 2,4-trimethyl hexamethylene diisocyanate, 2,4,4-trimethyl hexamethylene diisocyanate, dodecamethylene diisocyanate, α,α'-dipropyl ether diisocyanate, 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, m- and p-phenylene diisocyanate, 1,3 -and 1,4-bis(isocyanate methyl) benzene, 1,5-dimethyl-2,4-bis(isocyanate methyl) benzene, 1,3,5-thisocyanate benzene, 2,4-toluene diisocyanate, 2,6-toluene diisocyanate, 2,4,6-toluene triisocyanate, α,α,α',α'-tetramethyl o-, m-, and p-xylylene diisocyanate, 4,4'- diphenylene diisocyanate methane, 4,4'-diphenylene diisocyanate, 3,3'-dichloro-4,4'-diphenylene diisocyanate, naphthalene-1,5-diisocyanate, isophorone diisocyanate, transvinylidene diisocyanate, and mixtures of the aforementioned polyisocyanates. Adducts of polyisocyanates are e.g., biurets, isocyanurates, allophonates, uretdiones, and mixtures thereof. Examples of such adducts are the adduct of two molecules of hexamethylene diisocyanate or isophorone diisocyanate to a diol such as ethylene glycol, the reaction product of 3 molecules of hexamethylene diisocyanate and 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (Desmodur® N3390), the uretdione of hexamethylene diisocyanate (Desmodur® N3400), the allophanate of hexamethylene diisocyanate (Desmodur® LS 2101), and the isocyanurate of isophorone diisocyanate (Vestanate® T1890). Furthermore, (co)polymers of isocyanate-functional monomers include α,α'-dimethyl-m-isopropenyl benzyl isocyanate.

The solvents of the aqueous polymer dispersions used in the invention are water and, if needed, organic solvents or mixtures of organic solvents added during the formulation for a better film formation at room temperature.

As organic solvents it is possible to use all known solvents. Preference is given to the solvents used in the paints industry such as aliphatic hydrocarbons (e.g. mineral spirits, kerosene, high flashpoint VM&P naphtha, and the like); aromatic hydrocarbons (e.g. benzene, toluene, xylene, solvent naphtha 100, 150, 200 and the like); alcohols (e.g. ethanol. n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol), glycol ethers (e.g. methoxypropanol); glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxy propyl acetate and the like); and mixtures thereof.

If needed at all, the organic solvents are preferably used in an amount in the range from 0,1 to 10% by weight, more preferably in the range from 0,1 to 8% by weight, most preferably in the range from 0,1 to 5% by weight, based on the overall weight of the coating system.

Paints, inks and other formulations are prepared from the one-component coating systems of the invention by conventional methods.

The aqueous coating systems of the invention are suitable for all fields of use in which aqueous painting and coating systems with stringent requirements concerning the resistance of the films are used. In particular this is the coating and sealing of wood and wood-based materials and herein the use as transparent primer, and/or topcoat materials, clearcoat materials and high-gloss and matte coating materials potentially useful for all layer of build up of completely coated devices.

Preference is given to the coating of wood or wood-based materials at the usual processing temperatures such as 5° C. to 100° C.

The present invention will be further described in connection with preferred embodiments which can be combined freely unless the context clearly indicates otherwise.

In another embodiment of the method according to the invention the polyacrylate polymer is obtainable by the reaction of
(a) 0 to 60 weight-% of at least one compound selected from the group consisting of styrene and/or other vinyl aromatic compounds and
(b) 0 to 99.5 weight-% of at least one acrylic ester and
(c) 0.5 to 5 weight-% of at least one acid-functional, olefinically unsaturated monomer and
(d) 0 to 99.5 weight-% of at least one methacrylic ester, wherein the total weight proportions of the components (a) to (d) amount to 100% by weight.

Suitable vinyl aromatic compounds (a) are, for instance, vinyltoluene, o- and p-methylstyrene, butylstyrene, 4-n-butylstyrene, 4-n-decylstyrene, halogenated styrenes such as monochlorostyrenes, dichlorostyrenes, tribromostyrenes or tetrabromostyrene. Styrene is preferred.

Suitable acrylic esters (b) particularly comprise methylacrylate, ethylacrylate, propylacrylate, isopropyl acrylate, n-butylacrylate, sec-butylacrylate, tert.-butylacrylate, pentyl acrylate, hexyl acrylate, heptyl acrylate, octylacrylate, 2-octylacrylate, ethylhexylacrylate, nonylacrylate, 2-methyl-octylacrylate, 2-tert.-butylheptylacrylate, 3-iso-propylheptylacrylate, decyl acrylate, undecylacrylate, 5-methylundecylacrylate, dodecylacrylate, 2-methyldodecylacrylate, tridecylacrylate, 5-methyltridecylacrylate, tetradecylacrylate, pentadecylacrylate, hexadecylacrylate, 2-methylhexade-cylacrylate, heptadecylacrylate, 5-iso-propylheptadecylacrylate, 5-ethyloctadecylacrylate, octadecylacrylate, nonadecylacrylate, eicosylacrylate, cycloalkylacrylates such as cyclopentylacrylate, cyclohexylacrylate, 3-vinyl-2-butylcyclohexylacrylate, cycloheptylacrylate, cyclooctylacrylate, bornylacrylate, tetrahydrofurfurylacrylate and isobornylacrylate. Ethylacrylate, n-butylacrylate, ethylhexylacrylate, cyclohexylacrylate are preferred; ethylacrylate, n-butylacrylat or ethylhexylacrylate are particularly preferred.

Suitable olefinically unsaturated, acid-functional monomers (c) are sulphone, phosphate or carboxyl acid functional monomers, unsaturated carboxyl acid functional monomers such as acrylic acid, methacrylic acid, β-carboxyethylacrylate, crotonic acid, fumaric acid, maleic acid anhydride, itaconic acid or monoalkyl ester of dibasic acids or anhydrides such as maleic acid monoalkyl ester are preferred. Furthermore, unsaturated, radically polymerizable compounds with phosphate or phosphonate groups or sulphonic acid or sulphonate groups, such as are described in WO-A 00/39181 (p. 8, 1.13-p. 9, 1.19), are also suited as compounds of component (d). Acrylic acid or methacrylic acid is particularly preferred; acrylic acid is most preferred.

Suitable methacrylic esters (d) particularly comprise methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert.-butylheptyl methacrylate, 3-iso-propylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-iso-propylheptadecylme-thacrylate, 5-ethyloctadecyl methacrylate, octadecyl methacrylate, nonadecyl methacrylate, eicosyl methacrylate, cycloalkyl methacrylates such as cyclopentyl methacrylate, cyclohexyl methacrylate, 3-vinyl-2-butylcyclohexyl methacrylate, cycloheptyl methacrylate, cyclooctyl methacrylate, bornyl methacrylate, tetrahydrofurfuryl methacrylate or isobornyl methacrylate. Furthermore, the derivatives of methacrylic acid also may be employed in the form of the corresponding nitriles or amides such as methacrylnitrile or methacrylamide. Additionally there is the possibility to use other functional monomers depending on the desired application, such as diacetone methacrylamide or acetoacetoxyethyl methacrylate. Methyl methacrylate, ethyl methacrylate, butyl methacrylate, tert-butyl methacrylate are preferred; methyl methacrylate, tert-butyl methacrylate or butyl methacrylate are particularly preferred.

In another embodiment according to the invention the components a), b), c) and d) are present in the following amounts, the percentages of a), b), c) and d) adding up to 100 weight-%, based on the weight of a), b), c) and d):
a) ≥10 weight-% to ≤70 weight-%, preferably ≥20 weight-% to ≤60 weight-%;
b) ≥10 weight-% to ≤80 weight-%, preferably ≥20 weight-% to ≤70 weight-%;
c) ≥0,5 weight-% to ≤4 weight-%, preferably ≥0,5 weight-% to ≤2 weight-%;
d) ≥10 weight-% to ≤80 weight-%, preferably ≥20 weight-% to ≤702 weight-%.

The manufacture of the polyacrylate dispersions may be performed in a manner known per se, such as by means of emulsion polymerization. Conveniently, it is performed by an inflow method wherein water, emulsifier and a small quantity of an initiator, where appropriate, are filled in first. In doing so, the filled in material preferably contains 40 to 80 parts by weight of water, based on the total amount of water, 0,1 to 1,5 parts by weight of emulsifier, based on the solid matter, and 0,01 to 0,3% by weight of an initiator, based on the solid matter, where appropriate, wherein the given parts by weight add to 100,00 parts by weight. Subsequently, a small quantity of the monomers, preferably 5 to 15% by weight, is added, and the initiator, preferably 0,01 to 0,3% by weight, is optionally added at the same time, to form an internal seed on which the further polymerization steps take place.

Then the monomers in the aforementioned proportions are continuously added to this internal seed and polymerized up to a conversion of at least 95,0% by weight, preferably at least 98,0% by weight, more preferably at least 99,0% by weight, most preferably at least 99,5% by weight, based on their respective total weights.

Normally, the emulsion is polymerized at a temperature of 30 to 100° C., preferably of 50 to 90° C.

The dispersions containing a polyacrylate polymer are stabilized by means of ionic and/or non-ionic emulsifiers and/or protective colloids, inter alia. As the ionogenic emulsifiers, primarily anionic emulsifiers are conceivable. These may be the alkali or ammonium salts of alkyl, aryl, or alkylaryl sulphonates, phosphates, phosphonates or compounds with other anionic end groups where oligo- or polyethylene-oxide units also may be located between the hydrocarbon radical and the anionic group. Typical examples are sodium laurylsulphate, sodium lauryldiglykolsulphate, sodium decylglykolethersulphate, sodium octylphenolglykolethersulphate or sodium dodecylbenolsulphate.

As the non-ionic emulsifiers, alkylpolyglycol ethers such as ethoxylation products of lauryl, oleyl or stearyl alcohol or of mixtures such as coconut oil alcohol are conventionally used. Alkylphenolpolyglycol ethers such as ethoxylation products of octyl or nonylphenol, diisopropylphenol, triisopropylphenol, di- or tri-tert-butylphenol are also suited. In addition to the mentioned compound classes, ethoxylation products of propylene oxide may also be employed.

As suitable protective colloids natural substances such as gum arabic, starch, alginates or modified natural substances such as methyl, ethyl, hydroxyalkyl or carboxymethyl cellulose or synthetic substances such as polyvinyl alcohol or modified polyvinyl alcohols or polyvinyl pyrrolidones are used.

The emulsifiers also may be modified by a corresponding functionalization such that they radically copolymerize with the monomers (surfmer).

Furthermore, it is also possible to use mixtures of the aforementioned emulsifiers.

An alkyl phosphate ester such as a phosphate ester of non-ionic and polyoxyethylene adducts (available under the name Dextrol OC® from Hercules firm, USA) is preferably employed as emulsifier. The total amount of emulsifier, based on the solid matter, is 0,3 to 1,5% by weight, preferably 0,3 to 1,0% by weight.

The emulsion is normally polymerized at 30 to 100° C., preferably 50 to 90° C. The polymerization medium may consist of water alone or and of mixtures of water and liquids mixable therewith such as methanol It is preferred to use water only. Emulsion polymerization may be performed both as a batch process and in the form of an inflow method including stage or gradient operation; the inflow method is preferred. With the inflow method polymerization is effected at a comparably small monomer pad wherein one or more monomers in pure or emulsified form and the mostly water-soluble auxiliary agents are added continuously, in stages or in the form of a gradient over various spatially separated inflows. The particle size is set by means of the formation in situ of an internal seed, the particle size of the seed being determined from the ratio of emulsifier to monomer. It is also possible to control the particle size by filling in an external seed with defined particle size first. The way the initiator is added to the polymerization vessel in the course of the radicalic aqueous emulsion polymerization is known to those skilled in the art. It may be filled in completely first or employed continuously or in stages in accordance with its consumption in the course of the radicalic aqueous emulsion polymerization. In particular, this depends on the chemical nature of the initiator system as well as on the polymerization temperature. Preferably one part is filled in first and the remainder is supplied to the polymerization zone in accordance with the consumption.

The polyacrylate polymer may preferably have a weight average molecular weight $M_w$ determined according to DIN 55672/1 in the range from $10^3$ to $10^6$ g/mol, more preferably in the range from $10^4$ to $5*10^5$ g/mol, most preferably in the range from $2*10^4$ to $2*10^5$ g/mol.

Preferably, the polyacrylate polymer in the coating system has an average particle diameter in the range from 40 to 200 nm, most preferably in the range from 80 to 160 nm. The particle diameter is determined by laser correlation spectroscopy (apparatus: Malvern Zetasizer 1000, Malvern Instruments LTD), and the Z-averages are given.

The inventively claimed coating system preferably has a solid matter content of 10 to 70% by weight, more preferably 25 to 60% by weight and most preferably 35 to 55% by weight, determined in accordance with DIN-EN ISO 3251.

The viscosity of the polyacrylate polymer dispersion composition may be between 5 and 300 mPa·s, preferably between 10 and 150 mPa·s, most preferably between 15 and 100 mPa·s. The determination of viscosity is performed with a VT-500 rotation viscosimeter of Fa. Haake according to DIN 53019.

In another embodiment of the coating system according to the invention, the compounds of elements of sub-groups 5 and/or 6 of the periodic table are compounds of elements chosen from the group consisting of vanadium, tantalum, molybdenum and tungsten.

Examples of compounds of molybdenum and/or of tungsten which can be used in accordance with the invention can be selected from the group consisting of ammonium molybdate, lithium molybdate, sodium molybdate, potassium molybdate, rubidium molybdate, caesium molybdate, ammonium paramolybdate $(NH_4)_6Mo_7O_{24}.4H_2O$, molybdenyl bisacetylacetonate $MoO_2(C_5H_7O_5)_2$, molybdenum dioxide tetramethylheptadionate $MoO_2(TMHD)_2$, molybdenum alkoxides formed from 1,2-, 1,3- or 1,4-diols such as ethylene glycol, propylene glycol or 1,4-butanediolmolybdic acid, molybdenum oxides, tetraethylammonium molybdate, sodium tungstate, magnesium molybdate, calcium molybdate, tungstic acid, lithium tungstate and phosphotungstic acid.

Preferably, the compounds of elements of sub-groups 5 and/or 6 of the periodic table are chosen from the group consisting of ammonium molybdate, lithium molybdate, sodium molybdate, potassium molybdate, rubidium molybdate, caesium molybdate, ammonium paramolybdate, molybdenyl-bis-acetylacetonate, molybdenum dioxide tetramethyl heptadionate, molybdenum alcoholates of 1,2-, 1,3- and/or 1,4-diols, molybdenum oxides, tetraethylammonium molybdate, magnesium molybdate and calcium molybdate. Lithium molybdate is particularly preferred.

In another embodiment of the coating system according to the invention, the compounds of elements of sub-groups 5 and/or 6 of the periodic table are present in an amount of ≥0,0001 wt. % to ≤0,1 wt. % in the aqueous dispersion. Preferred ranges are ≥0,001 wt. % to ≤0,05 wt. %. The efficacy of these compounds is independent of the manner in which it is added. They may be added to the dispersion directly or also during previous steps in the manufacturing of the dispersion.

The present invention further relates to a method for improving the appearance of grained wood surfaces, comprising the steps of:
  providing a grained wood surface and
  applying a coating system comprising an aqueous polyacrylate polymer dispersion and one or more compounds of elements of sub-groups 5 and/or 6 of the periodic table in which the particular element has an oxidation state of at least +4, whereby the polyacrylate polymer does not contain any urethane moieties, to the grained wood surface.

With respect to wood the term "grain" refers to the alternating regions of relatively darker and lighter wood resulting from the differing growth parameters occurring in different seasons. A grained wood surface is then a surface which displays such alternating regions, as opposed to fiberboards. Preferably, the wood surface is otherwise untreated before application of the dispersion.

In the method according to the invention the coating system is applied to the grained wood surface. The application may generally be effected by spraying, with plain rollers, gravure rollers, screen rollers, in serigraphy, also rotary serigraphy, and with a doctor-blade spreader, a chambered doctor blade or a rotary doctor blade, for example.

Preferably, the wood surface is selected from the group consisting of oak wood, maple wood, birch wood, teak wood, jatoba wood, sapele wood, Americal walnut wood, beech wood, cherry wood, Chinese maple wood, santos mohagony wood and kempas wood.

Yet another aspect of the present invention is the use of a coating system according to the invention for the coating of grained wood surfaces.

The present invention is also directed towards a grained wood surface comprising a coating obtained by applying a coating system according to the invention and subsequent drying of the coating system. Preferably, the wood surface is selected from the group consisting of oak wood, maple wood, birch wood, teak wood, jatoba wood, sapele wood, Americal walnut wood, beech wood, cherry wood, Chinese maple wood, santos mohagony wood and kempas wood. Drying of the coating system may take place at the usual temperatures used to process 1K binder systems, preferably at temperatures between 20° C. and 100° C., more preferably at temperatures between 20° C. and 50° C.

The invention is further illustrated with respect to the following examples without wishing to be limited by them.

EXAMPLES

1. Methods
1.1 Determination of the Particle Diameter

The average particle size (APS) was determined by laser correlation spectroscopy (apparatus: Malvern Zetasizer 1000, Malvern Instruments LTD), and the Z-averages are given.

1.2 Determination of the Solid Matter Content (SMC)

The solid matter content was determined in accordance with DIN-EN ISO 3251.

1.3 Determination of the Viscosity

The determination of viscosity may be performed with a VT-500 rotation viscosimeter of Fa. Haake according to DIN 53019.

Glossary

| Sty | Styrene, Aldrich, DE |
| MMA | Methyl methacrylate, Aldrich, DE |
| n-BA | n-Butylacrylat, Aldrich, DE |
| AA | Acrylic acid, Aldrich, DE |
| APS | Ammoniumpersulfat, Aldrich, DE |

Dextrol OC® 40 (PHT) Ionic surfactant, mixture of CAS 009046-01-9 (>25%), CAS 024938-91-8 (<10%), CAS 007664-38-2 (<10%), Hercules, USA

| Trade name | Description | Manufacturer |
|---|---|---|
| Byk ® 093, 341, 349 | Formulation additive | Byk Chemie, Wesel, DE |
| Dehydran ® 1620 | Formulation additive | Cognis GmbH, DE |
| BDG: Butyl diglycol | Cosolvent | |
| DSX 1514 | Thickener | Cognis GmbH, DE |

Dispersion 1: Aqueous One-Component (1K) Polyacrylate Dispersion

In a 3 l glass reactor with controlled heating and cooling and an agitator motor, in a nitrogen atmosphere, water is filled in first along with 4.,5 g of Dextrol OC® 40. Subsequently, the solution is heated to the given temperature. After reaching the polymerization temperature, the monomer mixture comprising 14.1 g MMA, 2.5 g BA and 14 g Sty and the initiator mixture of 0,5 g APS in 22 g water are added by means of a metering pump within 30 min for the preparation of the internal seed. Thereafter, the monomer mixture comprising of 123 g MMA, 14 g BA, 130 g Sty and 9.4 g AA and the aqueous solution of 2.2 g APS and 2.5 g Dextrol OC® in 300 g water are added at the corresponding temperature within 120 min for the preparation of the core. Immediately after the core polymerisation, the addition of shell starts with feeding of the monomer mixture comprising 200.6 g MMA, 230 g BA, 183 g Sty and 9.4 g of AA and simultaneously the aqueous solution of 2.2 g APS and 2.5 g Dextrol OC® in 300 g water.

After the additions of monomer mixture and aqueous solutions are complete, the aqueous solution of 0.5 g APS in 50 g water is added within 60 min for the post-activation of unreacted monomers. The dispersion continues to be agitated for a period of 60 min. and subsequently is cooled down. To set the pH to 7, the corresponding quantity of ammoniacal solution is slowly added in drops, and the finished dispersion is discharged through a 125 mm filter. A material having the following properties was formed:

Solids content: 39.9% (diluted)
Average particle size: 101 nm
pH: 7.4
Viscosity: 25 mPa·S Example 1 (Comparative Example)

The following formulation was prepared (numbers given are weight percentages):

| Dispersion 1 | 90 |
|---|---|
| BDG | 7.9 |
| Byk 093 | 1.0 |
| Byk 349 | 0.3 |
| Byk 341 | 0.4 |
| Dehydran 1620 | 0.2 |
| DSX 1514 | 0.2 |

Example 2

The same formulation as in example 1 was prepared. Additionally, 35 ppm of $Li_2MoO_4$ were added after the preparation.

The formulations as described in examples 1 and 2 were set to a flow cup viscosity of 25-30 seconds with the aid of a thickener solution and applied to an oak wood surface with a brush (approx. 120 g/m$^2$). After drying at room temperature for 6 h the first layer was sanded slightly before a second coating layer (120 g/m$^2$) was applied. The intensity of the coloring of the wood was assessed visually on a scale of 1 to 5 after the second layer has dried. A value of 1 being undesirable with no expression of the wood grain and 5 being a (desired) strong expression of the grain.

The results are summarized below (PAC: polyacrylate):

| Example | Type of 1K water based dispersion | Quantity (cal. on dispersions)/Qualtity of metal salt | wood wetting |
|---|---|---|---|
| 1 (comp.) | PAC | 0 | 3 |
| 2 | PAC | 35 ppm $Li_2MoO_4$ | 4 |

The invention claimed is:

1. A one-component coating system comprising
an aqueous polyacrylate polymer dispersion and
one or more compounds of elements of sub-groups 5 and/or 6 of the periodic table in which the particular element has an oxidation state of at least +4, wherein the compounds of elements of sub-groups 5 and/or 6 of the periodic table are selected from the group consisting of ammonium molybdate, lithium molybdate, sodium molybdate, potassium molybdate, rubidium molybdate, caesium molybdate, ammonium paramolybdate, molybdenyl-bis-acetylacetonate, molybdenum dioxide tetramethyl heptadionate, molybdenum alcoholates of 1,2-, 1,3- and/or 1,4-diols, molybdenum oxides, tetraethylammonium molybdate and magnesium molybdate,
whereby the polyacrylate polymer does not contain any urethane moieties and the coating system does not contain any curing agent selected from the group consisting of ketimine-based curing agents, aliphatic amine curing agents, aromatic amine curing agents, polyamide curing agents, thio-based curing agents, isocyanates, isocyanurates, (co)polymers of isocyanate-functional monomers and blocked isocyanates.

2. The coating system according to claim 1, wherein the polyacrylate polymer is obtainable by the reaction of
(a) 0 to 60 weight-% of at least one compound selected from the group consisting of styrene and/or other vinyl aromatic compounds and
(b) 0 to 99.5 weight-% of at least one acrylic ester and
(c) 0.5 to 5 weight-% of at least one acid-functional, olefinically unsaturated monomer and
(d) 0 to 99.5 weight-% of at least one methacrylic ester, wherein the total weight proportions of the components (a) to (d) amount to 100% by weight.

3. The coating system according to claim 1, wherein the compounds of elements of sub-groups 5 and/or 6 of the periodic table are present in an amount of ≥0.0001 wt. % to ≤0.1 wt. % in the aqueous dispersion.

4. A method for improving the appearance of grained wood surfaces, comprising the steps of:
providing a grained wood surface and
applying the coating system according to claim 1 to the grained wood surface.

5. The method according to claim 4, wherein the polyacrylate polymer is obtainable by the reaction of
(a) 0 to 60 weight-% of at least one compound selected from the group consisting of styrene and/or other vinyl aromatic compounds and
(b) 0 to 99.5 weight-% of at least one acrylic ester and
(c) 0.5 to 5 weight-% of at least one acid-functional, olefinically unsaturated monomer and
(d) 0 to 99.5 weight-% of at least one methacrylic ester, wherein the total weight proportions of the components (a) to (d) amount to 100% by weight.

6. The coating system according to claim 5, wherein the compounds of elements of sub-groups 5 and/or 6 of the periodic table are present in an amount of ≥0.0001 wt. % to ≤0.1 wt. % in the aqueous dispersion.

7. A grained wood surface comprising a coating obtained by applying the coating system according to claim 1 to the grained wood surface and subsequent drying of the coating system.

8. The coating system according to claim 1, wherein the compounds of elements of sub-groups 5 and/or 6 of the periodic table are present in an amount of ≥0.001 wt. % to ≤0.05 wt. % in the aqueous dispersion.

9. A one-component coating system consisting of
an aqueous polyacrylate polymer dispersion not containing any urethane moieties, and
one or more compounds of elements of sub-groups 5 and/or 6 of the periodic table in which the particular element has an oxidation state of at least +4, wherein the compounds of elements of sub-groups 5 and/or 6 of the periodic table are selected from the group consisting of ammonium molybdate, lithium molybdate, sodium molybdate, potassium molybdate, rubidium molybdate, caesium molybdate, ammonium paramolybdate, molybdenyl-bis-acetylacetonate, molybdenum dioxide tetramethyl heptadionate, molybdenum alcoholates of 1,2-, 1,3- and/or 1,4-diols, molybdenum oxides, tetraethylammonium molybdate and magnesium molybdate.

10. A one-component coating system comprising
an aqueous polyacrylate polymer dispersion and
one or more compounds of elements of sub-groups 5 and/or 6 of the periodic table in which the particular element has an oxidation state of at least +5,
whereby the polyacrylate polymer does not contain any urethane moieties and the coating system does not contain any curing agent selected from the group consisting of ketimine-based curing agents, aliphatic amine curing agents, aromatic amine curing agents, polyamide curing agents, thio-based curing agents, isocyanates, isocyanurates, (co)polymers of isocyanate-functional monomers and blocked isocyanates.

* * * * *